United States Patent
Sapin et al.

(10) Patent No.: US 10,806,657 B2
(45) Date of Patent: Oct. 20, 2020

(54) REHABILITATION SYSTEM AND METHOD

(71) Applicant: UNIVERSITÈ CATHOLIQUE DE LOUVAIN, Louvain la Neuve (BE)

(72) Inventors: Julien Sapin, Hannut (BE); Bruno Dehez, Liernu (BE); Maxime Gilliaux, Macon (BE)

(73) Assignee: UNIVERSITÈ CATHOLIQUE DE LOUVAIN, Louvain la Neuve (BE)

( * ) Notice: Subject to any disclaimer, the term of this patent is extended or adjusted under 35 U.S.C. 154(b) by 401 days.

(21) Appl. No.: 15/762,222

(22) PCT Filed: Sep. 23, 2016

(86) PCT No.: PCT/EP2016/072676
§ 371 (c)(1),
(2) Date: Mar. 22, 2018

(87) PCT Pub. No.: WO2017/050961
PCT Pub. Date: Mar. 30, 2017

(65) Prior Publication Data
US 2018/0271738 A1    Sep. 27, 2018

(30) Foreign Application Priority Data
Sep. 23, 2015   (EP) .................................. 15186494 9

(51) Int. Cl.
*A61H 1/02* (2006.01)
*B25J 9/16* (2006.01)
(Continued)

(52) U.S. Cl.
CPC .......... *A61H 1/0274* (2013.01); *A61H 1/0237* (2013.01); *B25J 9/1615* (2013.01);
(Continued)

(58) Field of Classification Search
CPC .......... A61H 1/02; A61H 1/0274; A61H 3/00; A61H 1/0237; A61H 1/024; A61H 1/0277;
(Continued)

(56) References Cited

U.S. PATENT DOCUMENTS 4,885,687 A * 12/1989 Carey ..................... A61B 5/225
434/261
5,466,213 A * 11/1995 Hogan ..................... A61H 1/02
601/33

(Continued)

OTHER PUBLICATIONS

Krebs et al. "Rehabilitation Robotics: Performance-Based Progressive Robot-Assisted Therapy", Autonomous Robots, vol. 15, No. 1, Jul. 1, 2003, pp. 7-20. (Year: 2003).*

*Primary Examiner* — Justine R Yu
*Assistant Examiner* — Christopher E Miller
(74) *Attorney, Agent, or Firm* — Nixon & Vanderhye (57) ABSTRACT

A rehabilitation system for rehabilitation of a subject including at least one end-effector for interacting with the subject, the end-effector having at least two degrees of freedom of motion, at least one actuator for actuating the at least one end-effector, at least one sensor for measuring at least the position and the speed of the at least one end-effector; at least one sensor for measuring the interaction force between the subject and the end-effector; a memory including at least two initial coefficients and a session including at least one exercise including at least one reference trajectory to be carried out by the subject through actuation of the end effector; and an actuator controlling unit. The memory delivers the initial coefficients and the session, the sensors deliver measurement signals to the controlling unit, and the controlling unit provides a force-controlled feedback based on the initial coefficients.

17 Claims, 1 Drawing Sheet

(51) Int. Cl.
  *G05B 19/423* (2006.01)
  *B25J 11/00* (2006.01)
(52) U.S. Cl.
  CPC ........... *B25J 9/1633* (2013.01); *B25J 11/008* (2013.01); *G05B 19/423* (2013.01); *A61H 2201/164* (2013.01); *A61H 2201/1635* (2013.01); *A61H 2201/1659* (2013.01); *A61H 2201/5007* (2013.01); *A61H 2201/5038* (2013.01); *A61H 2201/5043* (2013.01); *A61H 2201/5058* (2013.01); *A61H 2201/5061* (2013.01); *A61H 2201/5064* (2013.01); *A61H 2201/5079* (2013.01); *G05B 2219/39342* (2013.01); *G05B 2219/45109* (2013.01); *Y10S 901/09* (2013.01)
(58) Field of Classification Search
  CPC .. A61H 1/0281; A61H 1/0285; G05B 19/423; G05B 2219/45109; B25J 9/1633
  See application file for complete search history.

(56) References Cited

U.S. PATENT DOCUMENTS

| | | | | |
|---|---|---|---|---|
| 5,734,373 | A * | 3/1998 | Rosenberg | A63F 13/06 345/161 |
| 6,613,000 | B1 * | 9/2003 | Reinkensmeyer | A61B 5/221 600/587 |
| 7,837,599 | B2 * | 11/2010 | Kowalczewski | G06F 19/3481 482/44 |
| 9,861,856 | B1 * | 1/2018 | Miller | A63B 21/00178 |
| 2006/0277074 | A1 * | 12/2006 | Einav | G06Q 50/24 705/3 |
| 2006/0293617 | A1 * | 12/2006 | Einav | G06F 3/016 601/33 |
| 2007/0282228 | A1 * | 12/2007 | Einav | A61B 5/16 601/33 |
| 2008/0139975 | A1 * | 6/2008 | Einav | A61B 5/1124 601/33 |
| 2008/0243038 | A1 * | 10/2008 | Bennett | A63F 13/10 601/33 |
| 2011/0112441 | A1 * | 5/2011 | Burdea | G06F 19/3418 600/595 |
| 2011/0300994 | A1 * | 12/2011 | Verkaaik | A61H 1/0285 482/51 |
| 2012/0143104 | A1 * | 6/2012 | Tee | A61H 1/02 601/23 |
| 2014/0107843 | A1 * | 4/2014 | Okazaki | B66C 23/005 700/260 |
| 2015/0005138 | A1 * | 1/2015 | Yamada | A61H 1/0237 482/4 |
| 2015/0141878 | A1 * | 5/2015 | Roy | A61H 1/02 601/34 |
| 2015/0190200 | A1 * | 7/2015 | Courtine | A61B 5/0048 604/20 |
| 2015/0302777 | A1 * | 10/2015 | Campolo | A61H 1/0274 434/262 |
| 2016/0000633 | A1 * | 1/2016 | An | A61H 1/0277 601/33 |
| 2016/0296405 | A1 * | 10/2016 | Oshima | A63B 21/00178 |
| 2017/0095391 | A1 * | 4/2017 | Sapin | A61B 5/4064 |
| 2017/0132947 | A1 * | 5/2017 | Maeda | A61H 1/02 |
| 2017/0165144 | A1 * | 6/2017 | Ban | A61H 1/0281 |
| 2017/0209327 | A1 * | 7/2017 | Hou | A63B 21/4035 |
| 2018/0318628 | A1 * | 11/2018 | Roh | A63B 23/035 |

* cited by examiner

REHABILITATION SYSTEM AND METHOD

FIELD OF INVENTION

The present invention relates to a system and a method of rehabilitation. In particular, the present invention relates to a neuro-rehabilitation system comprising a force-controlled robotic device and to a neuro-rehabilitation method assisted by a force-controlled robotic device.

BACKGROUND OF INVENTION

Stroke is a major cause of disability worldwide with approximately 800,000 new cases reported annually only in the United States, of which about 130,000 die. In the European Union stroke incidence appears to be markedly higher with over 460,000 deaths each year. The physical effects of stroke are variable and may include impairment in motor and sensory systems, language, perception, emotional and cognitive functions. Impairment of motor function usually involves paralysis or paresis of the muscles on the side of the body that is contralateral to the side of the brain lesion. People who have experienced a severe stroke often have significant impairment of muscle function of different limbs and body segments resulting in severe disability.

In order to recover or retain functional ability after a stroke or injury, patients undergo rehabilitation therapy, such as occupational and physical therapy. Physical therapy with hands is still the main approach. However, the therapy with hands strongly relies on the physical therapist's personal experiences, and there is no means for accurately controlling the magnitude of applied force and the rotating extent of joint. Moreover one-to-one interaction between a therapist and a patient is limited in providing high intensity and high repetition training.

Robotic or interactive training shows great potential for application in the field of rehabilitation medicine. Robotic or interactive training has several advantages as they can assist, enhance and quantify rehabilitation, especially neuro-rehabilitation. Robotic device-assisted rehabilitation is indeed more efficient in delivering routine physical and occupational therapy activities and also provides data that can facilitate patient diagnosis.

Unlike standard industrial robots, robotic devices adapted for rehabilitation guides movement like a therapist guiding the patient. Impaired subjects will indeed neither follow straight lines nor move along smooth trajectories. Some subject might not even be able to start movement. Robotic devices adapted for rehabilitation assist the subject by providing an assistive or resistive force field if the subject is unable to aim at a target and/or to move at a predefined speed.

It is known to use such robotic devices. For instance, U.S. Pat. No. 5,466,213 discloses an interactive robotic therapist implementing a virtual spring i.e. a force proportional to the distance between the subject's member and the trajectory with a constant stiffness coefficient. Said robotic devices may generate considerable forces and does not provide as-needed assistance challenging the subject.

US patent application 2006/0293617 also discloses a method of rehabilitation comprising passive motion, resisted motion, assisted motion or force filed motion wherein deviation from the trajectory meets with resistance. In an exemplary embodiment, resistance varies as a function of distance from the trajectory. Within said embodiment, a constant stiffness is used to guide the patient.

Krebs et al. introduces an adaptive algorithm based on the subject performance in previous exercises so that the therapy is tailored to each patient's abilities (H I Krebs et al (2003) Rehabilitation robotics: performance based progressive robot-assisted therapy, Autonomous Robots, 15, 7-20). Krebs discloses force related to the deviation with at least one factor which may vary between games based on the patient's performance and variability. However, Krebs et al. does not defined the way the factors varied based on patient's performance.

Therefore it is an object of the present invention to provide a rehabilitation system and a robotic device-assisted rehabilitation method implementing a performance based assistance, especially a movement-related feedback with online variable stiffness and damping coefficients. Said variable stiffness and damping coefficients provide gentle assistance which motivate the subject and maximize the chance to deliver optimal therapy. The present method also challenges the subject in order to improve its functional abilities and to avoid the feeling of personal failure.

SUMMARY

The present invention thus relates to a rehabilitation system for rehabilitation of a subject comprising:
  at least one end-effector for interacting with the subject, the said end-effector having at least two degrees of freedom of motion;
  at least one actuator for actuating the at least one end-effector;
  at least one sensor for measuring at least the position and the speed of the at least one end-effector;
  at least one sensor for measuring the interaction force between the subject and the end-effector;
  a memory comprising at least two initial coefficients $k_{lat}$, $c_{lat}$ and a session comprising at least one exercise including at least one reference trajectory to be carried out by the subject through actuation of the end effector; and
  a controlling unit for controlling the actuator;
wherein the memory is connected to the controlling unit for delivering the initial coefficients and the session, the sensors are connected to the controlling unit for delivering measurement signals, and the controlling unit is adapted to provide a force-controlled feedback comprising a lateral interaction force $F_{lat}$:

$$F_{lat} = k_{lat}(x_{proj} - x) - c_{lat}\dot{x}_\perp$$

wherein said lateral interaction force limits deviation of the end effector actuated by the subject along the reference trajectory and wherein $(x_{proj} - x)$ is the deviation of the end-effector actuated by the subject along the reference trajectory, $\dot{x}_\perp$ is the speed of the end-effector actuated by the subject perpendicular to the reference trajectory, $k_{lat}$ is a stiffness coefficient and $c_{lat}$ is a damping coefficient; and wherein the memory further comprises a time interval and wherein the controlling unit is adapted to change online the stiffness coefficient $k_{lat}$ at the end of each time interval by increments based on a statistical analysis of the values of the deviation of the end-effector actuated by the subject along the reference trajectory.

According to one embodiment, the controlling unit is adapted to change online the damping coefficient $c_{lat}$ at the end of each time interval by increments based on a statistical analysis of the values of the deviation of the end-effector actuated by the subject along the reference trajectory.

According to one embodiment, said stiffness coefficient $k_{lat}$ and/or said damping coefficient $c_{lat}$ varies at the end of each time interval by increments which do not exceed a predefined value.

According to one embodiment, said increments are either positive, negative or zero.

According to one embodiment, the positive increments and the negative increments are constant during one exercise or one session. According to one embodiment, $k_{lat}$ and/or $c_{lat}$ varies with a positive increment if the mean of the values of the deviation of the end-effector actuated by the subject along the reference trajectory is higher than a predetermined threshold; and wherein $k_{lat}$ and/or $c_{lat}$ varies with a negative increment if the mean of the values of the deviation of the end-effector actuated by the subject along the reference trajectory is lower than the said predetermined threshold.

According to one embodiment, the absolute value of the positive increment of $k_{lat}$ and/or $c_{lat}$ differs from the absolute value of the negative increment of $k_{lat}$ and/or $c_{wt}$.

According to one embodiment, $k_{lat}$ increases or decreases with an increment ranging from 1 N/m to 500 N/m.

According to one embodiment, the memory further comprises two initial coefficients $c_{long}$, $v_{ref}$, and a second time interval; and wherein the force-controlled feedback provided by the controlling unit further comprises a longitudinal interaction force $F_{long}$:

$$F_{long} = c_{long}(v_{ref} - |\dot{x}_\parallel|)\frac{\dot{x}_\parallel}{|\dot{x}_\parallel|}$$

wherein said longitudinal interaction force helps the subject to move along the reference trajectory at a reference speed and wherein $(v_{ref}-|\dot{x}_\parallel|)$ is the difference between the reference speed $(v_{ref})$ and the speed of the end-effector actuated by the subject parallel to the reference trajectory, $\dot{x}_\parallel$ is the speed of the end-effector actuated by the subject parallel to the reference trajectory, $c_{long}$ is a damping coefficient and $v_{ref}$ is a reference speed; and
wherein the controlling unit is adapted to change online the damping coefficient $c_{long}$ at the end of each second time interval by increments based on the difference between the longitudinal speed of the end-effector actuated by the subject parallel to the reference trajectory and the reference speed.

According to one embodiment, the controlling unit is adapted to change online the reference speed $v_{ref}$ at the end of each second time interval by increments based on the difference between the longitudinal speed of the end-effector actuated by the subject parallel to the reference trajectory and the reference speed.

According to one embodiment, said damping coefficient $c_{long}$ and/or the said reference speed $v_{ref}$ varies at the end of each second time interval by increments which do not exceed a predefined value; said increments being positive, negative or zero.

According to one embodiment, the positive increments and the negative increments are constant during one exercise or one session.

According to one embodiment, $c_{long}$ and/or $v_{ref}$ varies with a positive increment if the mean of the differences between the reference speed $v_{ref}$ and the speed of the end-effector actuated by the subject is higher than a predetermined threshold; and wherein $c_{long}$ and/or $v_{ref}$ varies with a negative increment if the mean of the differences between the reference speed $v_{ref}$ and the speed of the end-effector actuated by the subject is lower or equal than said predetermined threshold.

According to one embodiment, the absolute value of the positive increment of $c_{long}$ and/or $v_{ref}$ differs from the absolute value of the negative increment of $c_{long}$ and/or $v_{ref}$.

According to one embodiment, $c_{long}$ increases or decreases with an increment ranging from 1 N.s/m to 250 N.s/m.

The present invention also relates to a rehabilitation method comprising the following steps:
  providing a robotic device comprising:
    at least one end-effector for interacting with a subject, the said end-effector having at least two degrees of freedom of motion;
    at least one actuator for moving the at least one end-effector;
    at least one sensor for recording at least the position and the speed of the at least one end-effector;
    at least one sensor for recording the interaction force between the subject and the end-effector; and
    a controlling unit for controlling the actuator;
  initiating a session comprising at least one exercise, including at least one reference trajectory to be carried out by the subject through actuation of the end effector; said initiation comprising initializing at least two coefficients $k_{lat}$, $c_{lat}$;
  the controlling unit providing a force-controlled feedback comprising a lateral interaction force $F_{lat}$:

$$F_{lat} = k_{lat}(\alpha)(x_{proj}-x) - c_{lat}(\alpha)\dot{x}_\perp$$

wherein $(x_{proj}-x)$ is the deviation of the end-effector actuated by the subject along the reference trajectory, $\dot{x}_\perp$ is the speed of the end-effector actuated by the subject perpendicular to the reference trajectory, $k_{lat}$ is a stiffness coefficient and $c_{lat}$ is a damping coefficient; said lateral interaction force limiting deviation of the end effector actuated by the subject along the reference trajectory;
wherein $k_{lat}$ is a variable stiffness coefficient and $c_{lat}$ is a damping coefficient depending on $\alpha$, wherein $\alpha$ is selected from a statistical analysis of the values of the deviation of the end-effector actuated by the subject along the reference trajectory; wherein the initiation comprises initializing a time interval; and wherein said variable stiffness coefficient $k_{lat}$ varies online at the end of each time interval by increments.

According to one embodiment, said damping coefficient $c_{lat}$ also varies online at the end of each time interval by increments.

According to one embodiment, said initiation further comprises initializing one coefficients $(c_{long})$, a reference speed $(v_{ref})$ and providing a second time interval;
  the force-controlled feedback provided by the controlling unit further comprises a longitudinal interaction force $F_{long}$:

$$F_{long} = c_{long}(\beta)(v_{ref}(\beta) - |\dot{x}_\parallel|)\frac{\dot{x}_\parallel}{|\dot{x}_\parallel|}$$

wherein $(v_{ref}-|\dot{x}_\parallel|)$ is the difference between the reference speed $(v_{ref})$ and the speed of the end-effector actuated by the subject parallel to the reference trajectory; $\dot{x}_\parallel$ is the speed of the end-effector actuated by the subject parallel to the reference trajectory and $c_{long}$ is a damping coefficient; said longitudinal interaction force helps the subject to move along the reference trajectory at a reference speed;

wherein $c_{long}$ is a variable damping coefficient and $v_{ref}$ is a reference speed depending on β, wherein β is selected from the difference between the longitudinal speed of the end-effector actuated by the subject parallel to the reference trajectory and the reference speed; and wherein said variable damping coefficient $c_{long}$ varies online at the end of each second time interval by increments.

According to one embodiment, said reference speed $v_{ref}$ also varies online at the end of each second time interval by increments.

Definitions

In the present invention, the following terms have the following meanings:
- "Deviation" refers to minimum distance between the end-effector actuated by a subject and a reference trajectory.
- "Exercise" refers to any exercise to be performed by the subject on a robotic device comprising at least one reference trajectory.
- "Movement" refers to any displacement of the end-effector actuated by a subject.
- "Reference" associated with the terms "force", "speed", "trajectory" or "position" refers to a predefined feature to be reached by the subject.
- "Session" refers to series of exercises.
- "Subject" refers to a mammal, preferably a human. In one embodiment, a subject may be a "patient", i.e. a warm-blooded animal, more preferably a human, who/which is awaiting the receipt of, or is receiving medical care.

DETAILED DESCRIPTION

This invention relates to a rehabilitation system providing an as-needed assistance to a subject in need thereof.

The said rehabilitation system for rehabilitation of a subject comprises:
- at least one end-effector for interacting with the subject, the said end-effector having at least two degrees of freedom of motion;
- at least one actuator for actuating the at least one end-effector;
- at least one sensor for measuring at least the position and the speed of the at least one end-effector;
- at least one sensor for measuring the interaction force between the subject and the end-effector;
- a memory comprising at least two initial coefficients and a session comprising at least one exercise including at least one reference trajectory to be carried out by the subject through actuation of the end effector; and
- a controlling unit for controlling the actuator;

wherein the memory is connected to the controlling unit for delivering the initial coefficients and the session; wherein the sensors are connected to the controlling unit for delivering measurement signals and wherein the controlling unit is adapted to provide a force-controlled feedback based on the said initial coefficients.

In order to ensure rehabilitation, the subject has to perform a movement along the reference trajectory corresponding to the ideal path that the patient must follow to perform the exercise. In order to improve the rehabilitation, the controlling unit of the present invention generates forces smoothly assisting the movement of a limb of a subject.

According to one embodiment, the reference trajectory is at least a two dimensional trajectory. According to one exemplary embodiment, as depicted in FIG. 1, the reference trajectory is a two dimensional trajectory.

Figure 1:
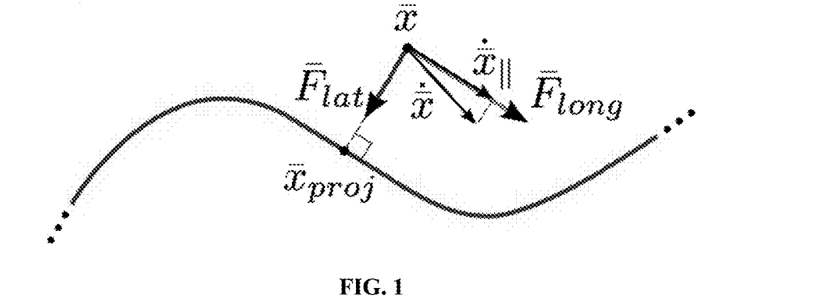
FIG. 1 illustrates a reference trajectory, the position of the end effector x, the speed of the end-effector $\dot{x}$, the deviation of the end-effector actuated by the subject along the reference trajectory $(x_{proj} - x)$, the speed of the end-effector actuated by the subject parallel to the reference trajectory $\dot{x}_\parallel$, an assisting attractive lateral interaction force $F_{lat}$ and an assisting longitudinal interaction force $F_{long}$ according to one embodiment of the invention.

According to the embodiment depicted in FIG. 1, the at least one sensor of the rehabilitation system acquires at least the position of the end effector x, the speed of the end-effector actuated by the subject $\dot{x}$, especially the speed of the end-effector actuated by the subject parallel to the reference trajectory $\dot{x}_{\parallel}$ and the speed of the end-effector actuated by the subject perpendicular to the reference trajectory $\dot{x}_{\perp}$.

According to one embodiment, the at least one sensor of the rehabilitation system acquires at least the lateral interaction force $F_{lat}$ and longitudinal interaction force $F_{long}$ between the patient and the end-effector.

According to one embodiment, in order to provide a force-controlled feedback, the controlling unit is adapted to modify at least a lateral interaction force $F_{lat}$ that helps the patient to stay on the reference trajectory. Especially, the lateral interaction force limits deviation of the end effector actuated by the subject along the reference trajectory. If the lateral interaction force is strictly positive, an assisting attractive force towards the reference trajectory is applied on the end-effector (see FIG. 1). On the contrary, if the lateral interaction force is strictly negative, a resistive force away from the reference trajectory is applied on the end-effector, thereby challenging the subject. According to one embodiment, the lateral interaction force is strictly positive. According to one embodiment, the lateral interaction force is positive and negative.

According to one embodiment, the force-controlled feedback comprises a lateral interaction force $F_{lat}$ correlated to the deviation of the end-effector actuated by the subject along the reference trajectory according to the equation:

$$F_{lat}=k_{lat}(x_{proj}-x)-c_{lat}\dot{x}_{\perp}$$

wherein $(x_{proj}-x)$ is the deviation of the end-effector actuated by the subject along the reference trajectory, $\dot{x}_{\perp}$ is the speed of the end-effector actuated by the subject perpendicular to the reference trajectory, $k_{lat}$ is a stiffness coefficient and $c_{lat}$ is a damping coefficient.

According to one embodiment, the controlling unit comprises a processor adapted to compute, from the measurement of the sensors, at least the deviation of the end-effector actuated by the subject along the reference trajectory $(x_{proj}-x)$.

According to one embodiment, the memory comprises at least the two initial coefficients $c_{lat}$ and $k_{lat}$. According to one embodiment $c_{lat}$, is positive, negative or zero. According to one embodiment, $k_{lat}$ is nonzero.

According to one embodiment, the controlling unit is adapted to change online the stiffness coefficient $k_{lat}$ and/or the damping coefficient $c_{lat}$ during each reference trajectory, at the end of each reference trajectory or at the end of each exercise. Especially, according to one embodiment, the memory comprises a first time interval and the controlling unit is adapted to change the stiffness coefficient $k_{lat}$ and or the damping coefficient $c_{lat}$ at the end of each such first time interval by increments.

According to one embodiment, by online it is meant that the first time interval is ranging from 1 ms to 10 s, from 5 ms to 5 s, from 100 ms to 2 s, preferably about 1 second.

According to one embodiment, the first time interval is lower than the duration required by a healthy subject (not impaired) to perform a reference trajectory during one exercise. Preferably, the first time interval is lower than 1/10, or lower than 1/100, of the duration required by a healthy subject (not impaired) to perform a reference trajectory during one exercise.

According to one embodiment, the controlling unit is adapted to change the stiffness coefficient $k_{lat}$ and/or the damping coefficient $c_{lat}$ based on a statistical analysis of the values of the deviation of the end-effector actuated by the subject along the reference trajectory. According to one embodiment, said statistical analysis is based on a statistical descriptor such as the means, median, mode, variance or standard deviation.

According to an embodiment, the controlling unit is adapted to change the stiffness coefficient $k_{lat}$ and/or the damping coefficient $c_{lat}$ based on the ratio between the length covered by the end-effector and the length along the reference trajectory.

Therefore, according to one embodiment, the lateral interaction force $F_{lat}$ of the force-controlled feedback is correlated to the deviation of the end-effector actuated by the subject along the reference trajectory according to the equation:

$$F_{lat} = k_{lat}(\alpha)(x_{proj} - x) - c_{lat}(\alpha)\dot{x}_{\perp}$$

wherein $(x_{proj}-x)$ is the deviation of the end-effector actuated by the subject along the reference trajectory, $\dot{x}_{\perp}$ is the speed of the end-effector actuated by the subject perpendicular to the reference trajectory, $k_{lat}$ is a stiffness coefficient, $c_{lat}$ is a damping coefficient and $\alpha$ is a statistical descriptor of the values of the deviation of the end-effector actuated by the subject along the reference trajectory.

According to one embodiment, the increments of $k_{lat}$ and/or $c_{lat}$ do not exceed a predefined value. According to one embodiment, the increments of $k_{lat}$ and/or $c_{lat}$ are positive, negative or zero. According to one embodiment, the increments of $k_{lat}$ and/or $c_{lat}$ are constant during each movement along a reference trajectory. According to one embodiment, the increments of $k_{lat}$ and/or $c_{lat}$ are constant during one reference trajectory of an exercise. According to one embodiment, the increments of $k_{lat}$ and/or $c_{lat}$ are constant during one exercise. According to one embodiment, the increments of $k_{lat}$ and/or $c_{lat}$ are constant during one session.

According to one embodiment, the absolute value of the positive increments of $k_{lat}$ and/or $c_{lat}$ differs from the absolute value of the negative increment of respectively $k_{lat}$ and/or $c_{lat}$. According to one embodiment, the increments of $k_{lat}$ and/or $c_{lat}$ are constant during each exercise or may vary between each reference trajectory of an exercise or between each exercise of a session.

According to one embodiment, the positive increments and the negative increments of $k_{lat}$ and/or $c_{lat}$ are constant during one reference trajectory of an exercise. According to one embodiment, the positive increments and the negative increments of $k_{lat}$ and/or $c_{lat}$ are constant during one exercise. According to one embodiment, the positive increments and the negative increments of $k_{lat}$ and/or $c_{lat}$ are constant during one session.

It has been found by the Applicant, that constant increments ensure an improved degree of smoothness of the movement and thus an optimal rehabilitation. According to one embodiment, whatever the deviation, the increments is of $k_{lat}$ and/or $c_{lat}$ remain constant during a reference trajectory, an exercise and/or a session.

According to one embodiment, $k_{lat}$ and/or $c_{lat}$ varies with a positive increment if the mean of the values of the deviation of the end-effector actuated by the subject along the reference trajectory is higher than a threshold, such as for instance 0.01 m for $k_{lat}$. According to one embodiment, $k_{lat}$ and/or $c_{lat}$ varies with a negative increment if the mean of the values of the deviation of the end-effector actuated by the subject along the reference trajectory is lower than a threshold, such as for instance 0.01 m for $k_{lat}$. According to one embodiment, the memory further comprises the said thresholds. According to one embodiment, the said threshold may be adjusted automatically by the controlling unit or manually by the physiotherapist.

Thus according to an exemplary embodiment, the deviation of the end-effector actuated by the subject along the reference trajectory $(x_{proj}-x)$ is acquired at a frequency of 125 Hz and each second (the time interval) means of said 125 values is computed. Based on said means, $k_{lat}$ and/or $c_{lat}$ is incremented either positively or negatively.

According to one embodiment, $k_{lat}$ increases with an increment ranging from 1 N/m to 500 N/m, preferably 157.5 N/m.

According to one embodiment, $k_{lat}$ decreases with an increment ranging from 1 N/m to 500 N/m, preferably 157.5 N/m.

According to one embodiment, $k_{lat}$ has an absolute value ranging from 0N/m to 5000 N/m, preferably from 0N/m to 3150 N/m.

According to one embodiment, $k_{lat}$ has an absolute value ranging from 1 N/m to 5000 N/m, preferably from 1 N/m to 3150 N/m.

According to one embodiment, $c_{lat}$ increases with an increment ranging from 1 N.s/m to 250 N.s/m, preferably 78.75 N.s/m.

According to one embodiment, $c_{lat}$ decreases with an increment ranging from 1 N.s/m to 250 N.s/m, preferably 78.75 N.s/m.

According to one embodiment, $c_{lat}$ has an absolute value ranging from 0 N.s/m to 2500 N.s/m, preferably from 0 N.s/m to 1575 N.s/m.

According to one embodiment, $k_{lat}$ is incremented at a frequency which can be adjusted, such as for instance 0.1 Hz, 0.5 Hz, 1 Hz, 10 Hz, 100 Hz or 1000 Hz.

According to one embodiment, $c_{lat}$ is incremented at a frequency which can be adjusted, such as for instance 0.1 Hz, 0.5 Hz, 1 Hz, 10 Hz, 100 Hz or 1000 Hz.

According to one embodiment, $k_{lat}$ is not inferior to 0N/m. According to an alternative embodiment, if a resistive lateral interaction force is sought, $k_{lat}$ may decrease below 0 N/m.

According to one embodiment, in order to provide a force-controlled feedback, the controlling unit is also adapted to modify at least a longitudinal interaction force $F_{long}$ that helps the patient to move along the trajectory at a reference speed. If the longitudinal interaction force is strictly positive, an assisting force helps the subject to move along the reference trajectory at a reference speed (see FIG. 1). On the contrary, if the longitudinal interaction force is strictly negative, a resistive force slows down movement of the subject along the reference trajectory, thereby challenging the subject. According to one embodiment, the longitudinal interaction force is strictly positive. According to one embodiment, the longitudinal interaction force is positive and negative.

According to one embodiment, the processor is also adapted to compute, from the measurement of the sensors, the difference between the reference speed $v_{ref}$ and the speed of the end-effector actuated by the subject parallel to the reference trajectory $\dot{x}_{\parallel}$.

According to one embodiment, the force-controlled feedback comprises a longitudinal interaction force $F_{long}$ correlated to difference between the reference speed and the speed of the end-effector actuated by the subject parallel to the reference trajectory according to the equation:

$$F_{long} = c_{long}(v_{ref} - |\dot{x}_{\|}|)\frac{\dot{x}_{\|}}{|\dot{x}_{\|}|}$$

wherein $(v_{ref}-|\dot{x}_{\|}|)$ is the difference between the reference speed $(v_{ref})$ and the speed of the end-effector actuated by the subject parallel to the reference trajectory; $\dot{x}_{\|}$ is the speed of the end-effector actuated by the subject parallel to the reference trajectory and $c_{long}$ is a damping coefficient.

According to one embodiment, the memory comprises at least the reference speed $v_{ref}$ and the damping coefficient $c_{long}$. According to one embodiment, the damping coefficient $c_{long}$ is positive, negative or zero.

According to one embodiment, the controlling unit is adapted to change online the damping coefficient $c_{long}$ and the reference speed $v_{ref}$ during each reference trajectory. Especially, according to one embodiment, the memory comprises a second time interval and the controlling unit is adapted to change the damping coefficient $c_{long}$ and the reference speed $v_{ref}$ at the end of each such second time interval by increments. According to one embodiment, the first time interval and the second time interval are the same or not.

According to one embodiment, by online it is meant that the second time interval is ranging from 1 ms to 10 s, from 5 ms to 5 s, from 100 ms to 2 s, preferably about 1 second.

According to one embodiment, the second time interval is lower than the duration required by a healthy subject (not impaired) to perform a reference trajectory during an exercise. Preferably, the second time interval is lower than 1/10, or lower than 1/100 of the duration required by a healthy subject (not impaired) to perform a reference trajectory during an exercise.

According to one embodiment, the controlling unit is adapted to change the damping coefficient $c_{long}$ and the reference speed $v_{ref}$ based on the difference between the longitudinal speed of the end-effector actuated by the subject parallel to the reference trajectory and the reference speed.

According to an alternative embodiment, the controlling unit is adapted to change the damping coefficient $c_{long}$ and the reference speed $v_{ref}$ based on the ratio between the reference speed and the speed of the end-effector actuated by the subject parallel to the reference trajectory.

Therefore, according to one embodiment, the longitudinal interaction force $F_{long}$ of the force-controlled feedback is correlated to difference between the reference speed and the speed of the end-effector actuated by the subject parallel to the reference trajectory according to the equation:

$$F_{long} = c_{long}(\beta)(v_{ref}(\beta) - |\dot{x}_{\|}|)\frac{\dot{x}_{\|}}{|\dot{x}_{\|}|}$$

wherein $(v_{ref}-|\dot{x}_{\|}|)$ is the difference between the reference speed $(v_{ref})$ and the speed of the end-effector actuated by the subject parallel to the reference trajectory; $\dot{x}_{\|}$ is the speed of the end-effector actuated by the subject parallel to the reference trajectory, $c_{long}$ is a damping coefficient and $\beta$ is a parameter such as the difference between the longitudinal speed of the end-effector actuated by the subject parallel to the reference trajectory and the reference speed.

According to one embodiment, the increments of $c_{long}$ and/or $v_{ref}$ do not exceed a predefined value. According to one embodiment, the increments of $c_{long}$ and/or $v_{ref}$ are positive, negative or zero. According to one embodiment, the increments of $c_{long}$ and/or $v_{ref}$ are constant during one movement along a reference trajectory. According to one embodiment, the increments of $c_{long}$ and/or $v_{ref}$ are constant during one reference trajectory of an exercise. According to one embodiment, the increments of $c_{long}$ and/or $v_{ref}$ are constant during one exercise. According to one embodiment, the increments of $c_{long}$ and/or $v_{ref}$ are constant during one session.

According to one embodiment, the absolute value of the positive increments of $c_{long}$ and/or $v_{ref}$ differs from the absolute value of the negative increment of $c_{long}$ and/or $v_{ref}$.

According to one embodiment, the positive increments and the negative increments of $c_{long}$ and/or $v_{ref}$ are constant during one reference trajectory of an exercise. According to one embodiment, the positive increments and the negative increments of $c_{long}$ and/or $v_{ref}$ are constant during one exercise. According to one embodiment, the positive increments and the negative increments of $c_{long}$ and/or $v_{ref}$ are constant during one session.

It has been found by the Applicant, that constant increments ensure an improved degree of smoothness of the movement and thus an optimal rehabilitation. According to one embodiment, whatever the speed of the end-effector actuated by the subject parallel to the reference trajectory, the increments of $c_{long}$ and/or $v_{ref}$ remain constant during a reference trajectory, an exercise and/or a session.

According to one embodiment, $c_{long}$ and/or $v_{ref}$ varies with a positive increment if the differences between the reference speed $v_{ref}$ and the speed of the end-effector actuated by the subject is higher than a threshold, such as for instance 0 m/s. According to one embodiment, $c_{long}$ and/or $v_{ref}$ varies with a negative increment if the differences between the reference speed $v_{ref}$ and the speed of the end-effector actuated by the subject is lower or equal than a threshold, such as for instance 0 m/s. According to one embodiment, the memory further comprises the said thresholds. According to one embodiment, the said threshold may be adjusted automatically by the controlling unit or manually by the physiotherapist.

According to one embodiment, $c_{long}$ increases with an increment ranging from 1 N.s/m to 250 N.s/m, preferably 78.75 N.s/m.

According to one embodiment, $c_{long}$ decreases with an increment ranging from 1 N.s/m to 250 N.s/m, preferably 78.75 N.s/m.

According to one embodiment, $c_{long}$ has an absolute value ranging from 0 N.s/m to 2500 N.s/m, preferably from 0 N.s/m to 1575 N.s/m.

According to one embodiment, $c_{long}$ is incremented at a frequency which can be adjusted, such as for instance 0.1 Hz, 0.5 Hz, 1 Hz, 10 Hz, 100 Hzz or 1000 Hz.

According to one embodiment, $c_{long}$ is not inferior to 0 N.s/m. According to an alternative embodiment, if a resistive longitudinal interaction force is sought, then $c_{long}$ varies with a positive increment if the differences between the reference speed $v_{ref}$ and the speed of the end-effector actuated by the subject lower and equal to 0; and $c_{long}$ varies with a negative increment if the differences between the reference speed $v_{ref}$ and the speed of the end-effector actuated by the subject is above 0.

According to one embodiment, $v_{ref}$ increases with an increment ranging from 0.001 m/s to 0.05 m/s, preferably 0.01 m/s.

According to one embodiment, $v_{ref}$ decreases with an increment ranging from 0.001 m/s to 0.05 m/s, preferably 0.01 m/s.

According to one embodiment, $v_{ref}$ has an absolute value ranging from 0 m/s to 1 m/s, from 0 m/s to 0.5 m/s, preferably 0.1 m/s.

According to one embodiment, $v_{ref}$ is incremented at a frequency which can be adjusted, such as for instance 0.1 Hz, 0.5 Hz, 1 Hz, 10 Hz, 100 Hz or 1000 Hz.

According to one embodiment, the reference trajectory comprises simple discrete trajectories consisting in reaching a target in the most precise and direct manner, complex discrete trajectories consisting in reaching target through a curved reference trajectory or cyclic simple or complex trajectories consisting in performing a series of simple discrete exercises and/or complex discrete exercises (e.g. point-to-point moves).

According to one embodiment, at the beginning of each exercise along a reference trajectory, the control unit is temporarily disabled during a time$t_{init}$.

According to one embodiment, $t_{init}$ is ranging from 0.5 s to 5 s, from 0.5 s to 2 s, preferably about 1 s.

According to one embodiment, if the subject initiates the movement before $t_{init}$, $t_{init}$ decreases for challenging the subject. According to one embodiment, if the subject initiates the movement after $t_{init}$, $t_{init}$ increases.

According to one embodiment, the at least one end-effector comprises a handle that can be grasp by the subject or to which the subject may be attached by an orthosis.

According to one embodiment, the acquisition frequency of the sensors is ranging from 50 to 1000 HZ, preferably about 250 Hz. According to one embodiment, the at least one sensor is connected to the controlling unit.

Figure 2:
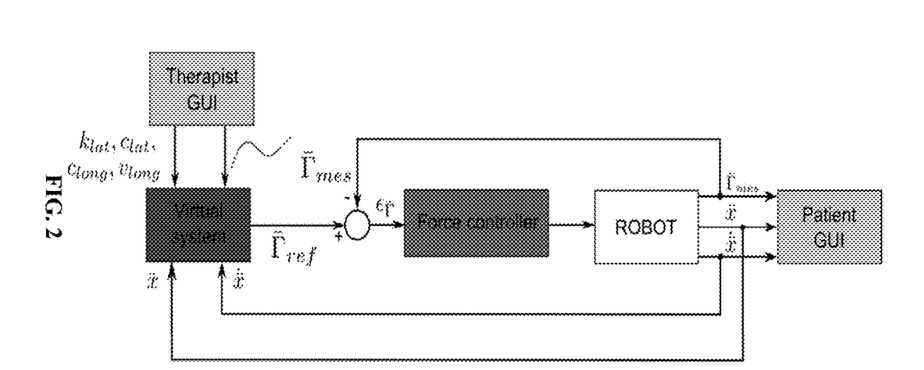
FIG. 2 illustrates a flow chart of the rehabilitation method according to one embodiment of the invention. The controlling unit according to the invention comprises a virtual system determining how the device reacts to the interaction with the subject and a force controller controlling the device.

According to one embodiment, as depicted in FIG. 2, the controlling unit comprises a virtual system and a force controller.

According to one embodiment, the controlling unit controls the at least one actuator and thereby the end-effector. According to one embodiment, the controlling unit controls the motion of the end-effector and is connected to the at least one actuator. According to one embodiment, said controlling unit is parameterized by a computer intended to be used by the therapist. According to one embodiment, at it is well known from those skilled in the art, the controlling unit comprises memory for storing data and a processor for calculating parameters changes depending on the subject-device interaction and the therapist instructions.

According to one embodiment, the rehabilitation system enables to assist the movement of a limb of a subject manipulating the end-effector, especially an upper limb of a subject.

According to one embodiment, the rehabilitation system according to the present invention also comprises a stimulation generator, such as an auditory generator or a visual generator delivering sensory stimulation to the subject based on at least one predetermined condition.

According to one embodiment, the predetermined condition is selected from α or β.

According to one embodiment, the predetermined condition is selected from a statistical analysis of the values of the deviation of the end-effector actuated by the subject along the reference trajectory. According to one embodiment, said statistical analysis is based on a statistical descriptor such as the means, median, mode, variance or standard deviation.

According to one embodiment, the predetermined condition is selected from the difference between the longitudinal speed of the end-effector actuated by the subject parallel to the reference trajectory and the reference speed.

According to one embodiment, the rehabilitation system according to the present invention further comprises a display, such as a screen or a head-mounted display. According to one embodiment, the rehabilitation system comprises a first display for controlling the controlling unit by the physiotherapist (Therapist GUI), and a second display for immersion of the subject in the therapy (Patient GUI). According to one embodiment, thanks to the second display, a graphical subject interface (Patient GUI) creates a user-friendly environment contextualized as task or game. According to one embodiment, the controlling unit uses input data from the sensors to drive an icon, cursor or other figure graphically on the display. Interactive games, such as maze games, controlled by the controlling may be used to ensure immersion of the subject in the therapy.

According to one embodiment, the reference trajectory and the movement of the end-effector actuated by the subject are displayed.

This invention also relates to a robotic device-assisted rehabilitation method providing an as-needed assistance to a subject in need thereof.

In particular, the robotic device-assisted rehabilitation method comprises the following steps:
providing a robotic device comprising:
at least one end-effector for interacting with a subject;
at least one actuator for moving the at least one end-effector;
at least one sensor for measuring the position and the speed of the at least one end-effector;
at least one sensor for measuring the interaction force between the subject and the end-effector; and
a controlling unit for controlling the actuator;
initiating a session comprising at least one exercise, including at least one reference trajectory, to be carried out by the subject through actuation of the end effector; said initiation comprising initializing at least two coefficients;
providing by the controlling unit a force-controlled feedback based on the said coefficients.

According to one embodiment, the force-controlled feedback comprises a lateral interaction force $F_{lat}$ correlated to the deviation of the end-effector actuated by the subject along the reference trajectory according to the equation:

$$F_{lat} = k_{lat}(\alpha)(x_{proj} - x) - c_{lat}(\alpha)\dot{x}_\perp$$

wherein $(x_{proj} - x)$ is the deviation of the end-effector actuated by the subject along the reference trajectory, $\dot{x}_\perp$ is the speed of the end-effector actuated by the subject perpendicular to the reference trajectory, $k_{lat}$ is a stiffness coefficient and $c_{lat}$ is a damping coefficient.

According to one embodiment, $k_{lat}$ and $c_{lat}$ are initialized at the beginning of the session.

According to the present invention, $k_{lat}$ is a variable stiffness coefficient depending on α, wherein α is selected from a statistical analysis of the values of the deviation of the end-effector actuated by the subject along the reference trajectory. According to one embodiment, said statistical analysis is based on a statistical descriptor such as the means, median, mode, variance or standard deviation.

According to one embodiment, $c_{lat}$ is a variable damping coefficient depending on α, wherein α is selected from a statistical analysis of the values of the deviation of the end-effector actuated by the subject along the reference trajectory. According to one embodiment, said statistical analysis is based on a statistical descriptor such as the means, median, mode, variance or standard deviation.

According to the present invention, the step of initiating a session further comprises the step of providing a first time interval. According to one embodiment, the variable coefficient $k_{lat}$ and/or and $c_{lat}$ varies online at the end of each first time interval by increments.

According to one embodiment, the increments of $k_{lat}$ and/or $c_{lat}$ are constant during one movement along a reference trajectory. According to one embodiment, the increments of $k_{lat}$ and/or $c_{lat}$ are constant during one reference trajectory of an exercise. According to one embodiment, the increments of $k_{lat}$ and/or $c_{lat}$ are constant during one exercise. According to one embodiment, the increments of $k_{lat}$ and/or $c_{lat}$ are constant during one session.

According to one embodiment, the force-controlled feedback comprises a longitudinal interaction force $F_{long}$ correlated to difference between the reference speed and the speed of the end-effector actuated by the subject parallel to the reference trajectory according to the equation:

$$F_{long} = c_{long}(\beta)(v_{ref}(\beta) - |\dot{x}_\parallel|)\frac{\dot{x}_\parallel}{|\dot{x}_\parallel|}$$

wherein $(v_{ref} - |\dot{x}_\parallel|)$ is the difference between the reference speed $(v_{ref})$ and the speed of the end-effector actuated by the subject parallel to the reference trajectory; $\dot{x}_\parallel$ is the speed of the end-effector actuated by the subject parallel to the reference trajectory and $c_{long}$ is a damping coefficient.

According to one embodiment, $c_{long}$ and $v_{ref}$ are initialized at the beginning of the session.

According to one embodiment, $c_{long}$ is a variable damping coefficient depending on $\beta$, wherein $\beta$ is selected from the difference between the longitudinal speed of the end-effector actuated by the subject parallel to the reference trajectory and the reference speed, the ratio between the reference speed and the speed of the end-effector actuated by the subject parallel to the reference trajectory or combination thereof.

According to one embodiment, $v_{ref}$ is a variable damping coefficient depending on $\beta$, wherein $\beta$ is selected from the difference between the longitudinal speed of the end-effector actuated by the subject parallel to the reference trajectory and the reference speed, the ratio between the reference speed and the speed of the end-effector actuated by the subject parallel to the reference trajectory or combination thereof.

According to one embodiment, a second time interval is provided at the beginning of the session. The variable damping coefficient $c_{long}$ and/or $v_{ref}$ varies online at the end of each second time interval by increments. According to one embodiment, the increments of $c_{long}$ and/or $v_{ref}$ are constant during one movement along a reference trajectory. According to one embodiment, the increments of $c_{long}$ and/or $v_{ref}$ are constant during one reference trajectory of an exercise. According to one embodiment, the increments of $c_{long}$ and/or $v_{ref}$ are constant during one exercise. According to one embodiment, the increments of $c_{long}$ and/or $v_{ref}$ are constant during one session.

According to one embodiment, the rehabilitation method according to the present invention also comprises the step of providing a sensory signal to the subject based on at least one predetermined condition. In particular, the sensory signal may be a visual signal, an auditory signal or an haptic signal.

According to one embodiment, the predetermined condition is selected from $\alpha$ or $\beta$.

According to one embodiment, the rehabilitation method according to the present invention also comprises the step of providing a display, such as a screen or a head-mounted display. According to one embodiment, the rehabilitation method comprises the step of providing a first display for controlling the controlling unit by the physiotherapist (Therapist GUI), and a second display for immersion of the subject in the therapy (Patient GUI). According to one embodiment, thanks to the second display, a graphical subject interface (Patient GUI) creates a user-friendly environment contextualized as task or game. According to one embodiment, the controlling unit uses input data from the sensors to drive an icon, cursor or other figure graphically on the display. Interactive games, such as maze games, controlled by the controlling may be used to ensure immersion of the subject in the therapy.

According to one embodiment, the rehabilitation method comprises the step of displaying the movement of the subject together with a serious game corresponding to the exercise.

The invention claimed is:

1. A rehabilitation system for rehabilitation of a subject comprising:
   at least one end-effector for interacting with the subject, the said end-effector having at least two degrees of freedom of motion;
   at least one actuator for actuating the at least one end-effector;
   at least one sensor for measuring at least the position and the speed of the at least one end-effector;
   at least one sensor for measuring the interaction force between the subject and the end-effector;
   a memory comprising at least two initial coefficients $k_{lat}$, $c_{lat}$ and a session comprising at least one exercise including at least one reference trajectory to be carried out by the subject through actuation of the end effector; and
   a controlling unit for controlling the actuator;
   wherein the memory is connected to the controlling unit for delivering the initial coefficients and the session, the sensors are connected to the controlling unit for delivering measurement signals, and the controlling unit is adapted to provide a force-controlled feedback comprising a lateral interaction force $F_{lat}$:

$$F_{lat} = k_{lat}(x_{proj} - x-) - c_{lat}\dot{x}_\perp$$

wherein said lateral interaction force limits deviation of the end effector actuated by the subject along the reference trajectory and wherein ($x_{proj}-x$) is the deviation of the end-effector actuated by the subject along the reference trajectory, $\dot{x}_\perp$ is the speed of the end-effector actuated by the subject perpendicular to the reference trajectory, $k_{lat}$ is a stiffness coefficient and $c_{lat}$ is a damping coefficient;

wherein the memory further comprises a time interval and wherein the controlling unit is adapted to change online the stiffness coefficient $k_{lat}$ at the end of each time interval by increments based on a statistical analysis of the values of the deviation of the end-effector actuated by the subject along the reference trajectory.

2. The rehabilitation system according to claim 1, wherein the controlling unit is adapted to change online the damping coefficient $c_{lat}$ at the end of each time interval by increments based on a statistical analysis of the values of the deviation of the end-effector actuated by the subject along the reference trajectory.

3. The rehabilitation system according to claim 1, wherein said stiffness coefficient $k_{lat}$ and/or said damping coefficient $c_{lat}$ varies at the end of each time interval by increments which do not exceed a predefined value.

4. The rehabilitation system according to claim 1, wherein said stiffness coefficient $k_{lat}$ and/or said damping coefficient $c_{lat}$ varies at the end of each time interval by increments which do not exceed a predefined value and said increments are either positive, negative or zero.

5. The rehabilitation system according to claim 1, wherein said stiffness coefficient $k_{lat}$ and/or said damping coefficient $c_{lat}$ varies at the end of each time interval by increments which do not exceed a predefined value; said increments are either positive, negative or zero; and the positive increments and the negative increments are constant during one exercise or one session.

6. The rehabilitation system according to claim 1, wherein said stiffness coefficient $k_{lat}$ and/or said damping coefficient $c_{lat}$ varies at the end of each time interval by increments which do not exceed a predefined value and said increments are either positive, negative or zero; and the absolute value of the positive increment differs from the absolute value of the negative increment.

7. The rehabilitation system according to claim 1, wherein said stiffness coefficient $k_{lat}$ and/or said damping coefficient $c_{lat}$ varies at the end of each time interval by increments which do not exceed a predefined value; said increments are either positive, negative or zero; and the positive increments and the negative increments are constant during one exercise or one session; and the absolute value of the positive increment differs from the absolute value of the negative increment.

8. The rehabilitation system according to claim 1, wherein said stiffness coefficient $k_{lat}$ and/or said damping coefficient $c_{lat}$ varies at the end of each time interval with a positive increment if the mean of the values of the deviation of the end-effector actuated by the subject along the reference trajectory is higher than a predetermined threshold; and wherein $k_{lat}$ and/or $c_{lat}$ varies with a negative increment if the mean of the values of the deviation of the end-effector actuated by the subject along the reference trajectory is lower than the said predetermined threshold.

9. A rehabilitation system for rehabilitation of a subject comprising:
at least one end-effector for interacting with the subject, the said end-effector having at least two degrees of freedom of motion;
at least one actuator for actuating the at least one end-effector;
at least one sensor for measuring at least the position and the speed of the at least one end-effector;
at least one sensor for measuring the interaction force between the subject and the end-effector;
a memory comprising at least two initial coefficients $k_{lat}$, $c_{lat}$ and a session comprising at least one exercise including at least one reference trajectory to be carried out by the subject through actuation of the end effector; and
a controlling unit for controlling the actuator;
wherein the memory is connected to the controlling unit for delivering the initial coefficients and the session, the sensors are connected to the controlling unit for delivering measurement signals, and the controlling unit is adapted to provide a force-controlled feedback comprising a lateral interaction force $F_{lat}$:

$$F_{lat}=k_{lat}(x_{proj}-x)-c_{lat}\dot{x}_\perp$$

wherein said lateral interaction force limits deviation of the end effector actuated by the subject along the reference trajectory and wherein ($x_{proj}-x$) is the deviation of the end-effector actuated by the subject along the reference trajectory, $\dot{x}_\perp$ is the speed of the end-effector actuated by the subject perpendicular to the reference trajectory, $k_{lat}$ is a stiffness coefficient and $c_{lat}$ is a damping coefficient;

wherein the memory further comprises a time interval and wherein the controlling unit is adapted to change online the stiffness coefficient $k_{lat}$ at the end of each time interval by increments based on a statistical analysis of the values of the deviation of the end-effector actuated by the subject along the reference trajectory and wherein the memory further comprises two initial coefficients $c_{long}$, $v_{ref}$ and a second time interval; and wherein the force-controlled feedback provided by the controlling unit further comprises a longitudinal interaction force $F_{long}$:

$$F_{long} = c_{long}(v_{ref} - |\dot{x}_\||)\frac{\dot{x}_\|}{|\dot{x}_\||}$$

wherein said longitudinal interaction force helps the subject to move along the reference trajectory at a reference speed and wherein ($v_{ref}-|\dot{x}_\||$) is the difference between the reference speed ($v_{ref}$) and the speed of the end-effector actuated by the subject parallel to the reference trajectory, $\dot{x}_\|$ is the speed of the end-effector actuated by the subject parallel to the reference trajectory, $c_{long}$ is a damping coefficient and $v_{ref}$ is a reference speed; and wherein the controlling unit is adapted to change online the damping coefficient $c_{long}$ at the end of each second time interval by increments based on the difference between the longitudinal speed of the end-effector actuated by the subject parallel to the reference trajectory and the reference speed.

10. The rehabilitation system according to claim 9, wherein the controlling unit is adapted to change online the reference speed $v_{ref}$ at the end of each second time interval by increments based on the difference between the longitudinal speed of the end-effector actuated by the subject parallel to the reference trajectory and the reference speed.

11. The rehabilitation system according to claim 9, wherein said damping coefficient $c_{long}$ and/or the said reference speed $v_{ref}$ varies at the end of each such second time interval by increments which do not exceed a predefined value.

12. The rehabilitation system according to claim 9, wherein said increments of $c_{long}$ and/or $v_{ref}$ are either positive, negative or zero.

13. The rehabilitation system according to claim 9, wherein said increments of $c_{long}$ and/or $v_{ref}$ are either positive, negative or zero and the positive increments and the negative increments are constant during one exercise or one session.

14. The rehabilitation system according to claim 9, wherein said increments of $c_{long}$ and/or $v_{ref}$ are either positive, negative or zero and the positive increments and the absolute value of the positive increment differs from the absolute value of the negative increment.

15. The rehabilitation system according to claim 9, wherein $c_{long}$ and/or $v_{ref}$ varies with a positive increment if the mean of the differences between the reference speed $v_{ref}$ and the speed of the end-effector actuated by the subject is higher than a predetermined threshold; and wherein $c_{long}$ and/or $v_{ref}$ varies with a negative increment if the mean of the differences between the reference speed $v_{ref}$ and the speed of the end-effector actuated by the subject is lower or equal than said predetermined threshold.

16. A rehabilitation method comprising the following steps:

providing a robotic device comprising:

at least one end-effector for interacting with a subject, the said end-effector having at least two degrees of freedom of motion;

at least one actuator for moving the at least one end-effector;

at least one sensor for recording at least the position and the speed of the at least one end-effector;

at least one sensor for recording the interaction force between the subject and the end-effector; and a controlling unit for controlling the actuator;

initiating a session comprising at least one exercise, including at least one reference trajectory to be carried out by the subject through actuation of the end effector; said initiation comprising initializing at least two coefficients $k_{lat}$, $c_{lat}$;

the controlling unit providing a force-controlled feedback comprising a lateral interaction force $F_{lat}$:

$$F_{lat} = k_{lat}(\alpha)(x_{proj} - x) - c_{lat}(\alpha)\dot{x}_\perp$$

wherein $(x_{proj} - x)$ is the deviation of the end-effector actuated by the subject along the reference trajectory, $\dot{x}_\perp$ is the speed of the end-effector actuated by the subject perpendicular to the reference trajectory, $k_{lat}$ is a stiffness coefficient and $c_{lat}$ is a damping coefficient; said lateral interaction force limiting deviation of the end effector actuated by the subject along the reference trajectory;

wherein $k_{lat}$ is a variable stiffness coefficient and $c_{lat}$ is a damping coefficient depending on $\alpha$, wherein $\alpha$ is selected from a statistical analysis of the values of the deviation of the end-effector actuated by the subject along the reference trajectory; the initiation comprises initializing a time interval;

and wherein said variable stiffness coefficient $k_{lat}$ varies online at the end of each time interval by increments.

17. The rehabilitation method according to claim 16, wherein:

said initiation further comprises initializing one coefficients ($c_{long}$), a reference speed ($v_{ref}$) and providing a second time interval;

the force-controlled feedback provided by the controlling unit further comprises a longitudinal interaction force $F_{long}$:

$$F_{long} = c_{long}(\beta)(v_{ref}(\beta) - |\dot{x}_\parallel|)\frac{\dot{x}_\parallel}{|\dot{x}_\parallel|}$$

wherein $(v_{ref} - |\dot{x}_\parallel|)$ is the difference between the reference speed ($v_{ref}$) and the speed of the end-effector actuated by the subject parallel to the reference trajectory; $\dot{x}_\parallel$ is the speed of the end-effector actuated by the subject parallel to the reference trajectory and $c_{long}$ is a damping coefficient; said longitudinal interaction force helps the subject to move along the reference trajectory at a reference speed;

wherein $c_{long}$ is a variable damping coefficient and $v_{ref}$ is a reference speed depending on $\beta$, wherein $\beta$ is selected from the difference between the longitudinal speed of the end-effector actuated by the subject parallel to the reference trajectory and the reference speed; and wherein said variable damping coefficient $c_{long}$ varies online at the end of each second time interval by increments.

* * * * *